(12) United States Patent
Ovayuak

(10) Patent No.: US 10,440,945 B2
(45) Date of Patent: Oct. 15, 2019

(54) HARMONICA-STYLE GOOSE CALL

(71) Applicant: Kelly Ovayuak, Inuvik (CA)

(72) Inventor: Kelly Ovayuak, Inuvik (CA)

( * ) Notice: Subject to any disclaimer, the term of this patent is extended or adjusted under 35 U.S.C. 154(b) by 0 days.

(21) Appl. No.: 14/504,790

(22) Filed: Oct. 2, 2014

(65) Prior Publication Data

US 2015/0093959 A1   Apr. 2, 2015

(30) Foreign Application Priority Data

Oct. 2, 2013  (CA) .................................. 2828664

(51) Int. Cl.
*A01M 31/00*   (2006.01)

(52) U.S. Cl.
CPC ................................ *A01M 31/004* (2013.01)

(58) Field of Classification Search
CPC ....... A63H 5/00; A63H 33/40; A01M 31/004; G10D 7/00; G10D 7/12; G10D 7/123
See application file for complete search history.

(56) References Cited

U.S. PATENT DOCUMENTS

| | | | |
|---|---|---|---|
| 2,570,816 A * | 10/1951 | Kimple | .................. G10D 17/00 446/202 |
| 2,584,549 A * | 2/1952 | Carhart | ............... A01M 31/004 446/202 |
| 3,738,056 A | 6/1973 | Schultz | |
| 4,221,075 A * | 9/1980 | Gallagher | ............ A01M 31/004 446/202 |
| 4,341,037 A | 7/1982 | Moss | |
| 4,483,097 A | 11/1984 | Piper | |
| 4,761,149 A * | 8/1988 | Laubach | ............. A01M 31/004 446/205 |
| 4,960,400 A | 10/1990 | Cooper | |
| 5,030,159 A * | 7/1991 | Beer | ........................ A63H 5/00 446/207 |
| 5,061,220 A | 10/1991 | Cooper | |
| 6,231,418 B1 * | 5/2001 | Hancock | ............. A01M 31/004 446/207 |

OTHER PUBLICATIONS

Description of Wolfer's Harp product sold by "Crit R Call". Available at least as early as Jul. 17, 2013.
Description of Bays Call product sold by "Bays Call". Available at least as early as Jul. 17, 2013.

* cited by examiner

*Primary Examiner* — Eugene L Kim
*Assistant Examiner* — Alyssa M Hylinski
(74) *Attorney, Agent, or Firm* — Davis & Bujold PLLC; Michael J. Bujold

(57) ABSTRACT

A harmonica-style goose call is described. A user assumes a blow position and by blowing through a blow space onto a diaphragm which vibrates and emits a tone. The blow space is made from interior profiles of varying depth on engaged housings. This permits the user to alter the pitch of the tone by selectively altering the blow position. In this way, the user can imitate the sound of a goose by altering the blowing three and the blow position.

6 Claims, 3 Drawing Sheets

HARMONICA-STYLE GOOSE CALL

FIELD

There is described a call that is used by hunters to imitate the call of a goose.

BACKGROUND

A harmonica-style duck call was developed by Lewis Bays (1922-2009) for use in calling wood ducks, it has been successfully used to imitate the calls of other varieties of ducks. The Bays call resembled a harmonica and consisted of an elongated first or upper housing, an elongated second or lower housing, spacers positioned between the upper housing and the lower housing to create a blow space, and a flexible diaphragm (an elastic was used) stretched across the blow space. By blowing into the blow space, the diaphragm is caused to vibrate and emit a tone. By selective blowing, the call of a duck can be imitated. The Bays call is not sufficiently versatile for use in imitating the calls of various varieties of geese. There will hereinafter be described a harmonica-style goose call.

SUMMARY

There is provided a harmonica-style goose call that consists of an elongated first housing and an elongated second housing. The first housing has a first end, a second end, an exterior surface and an interior surface. The interior surface has a first supporting and clamping member at the first end, a second supporting and clamping member at the second end, and a first profile on that portion of the interior surface between the first supporting and clamping member and the second supporting and clamping member. The second housing has a first end, a second end, an exterior surface and an interior surface. The interior surface has a first supporting and clamping member at the first end, a second supporting and clamping member at the second end, and a second profile on that portion of the interior surface between the first supporting and clamping member and the second supporting and clamping member. The first supporting and clamping member and the second supporting and clamping member of the first housing engage the first supporting and clamping member and the second supporting and clamping member of the second housing with the first profile and the second profile collectively forming a blow space. A flexible diaphragm is stretched between the respective engaged first supporting and clamping members and respective engaged second supporting and clamping members.

With the harmonica-style goose call, as described above, a user assumes a blow position and by blowing through the blow space causes the diaphragm to vibrate and emit a tone. At least one of the first profile and the second profile is of varying depth permitting the user to alter the pitch of the tone by selectively altering the blow position. In this way, the user can imitate the sound of a goose by altering the blowing three and the blow position.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
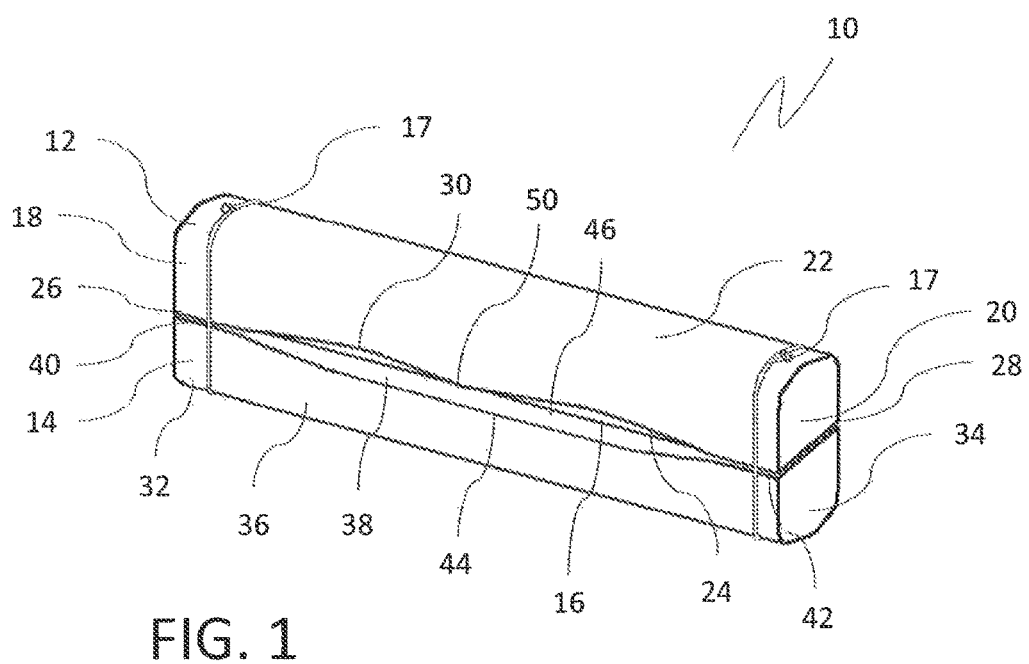
FIG. 1 is a perspective view of a harmonica-style goose call.

A harmonica-style goose call generally identified by reference numeral 10, will now be described with reference to FIG. 1 through 3.

Figure 2:
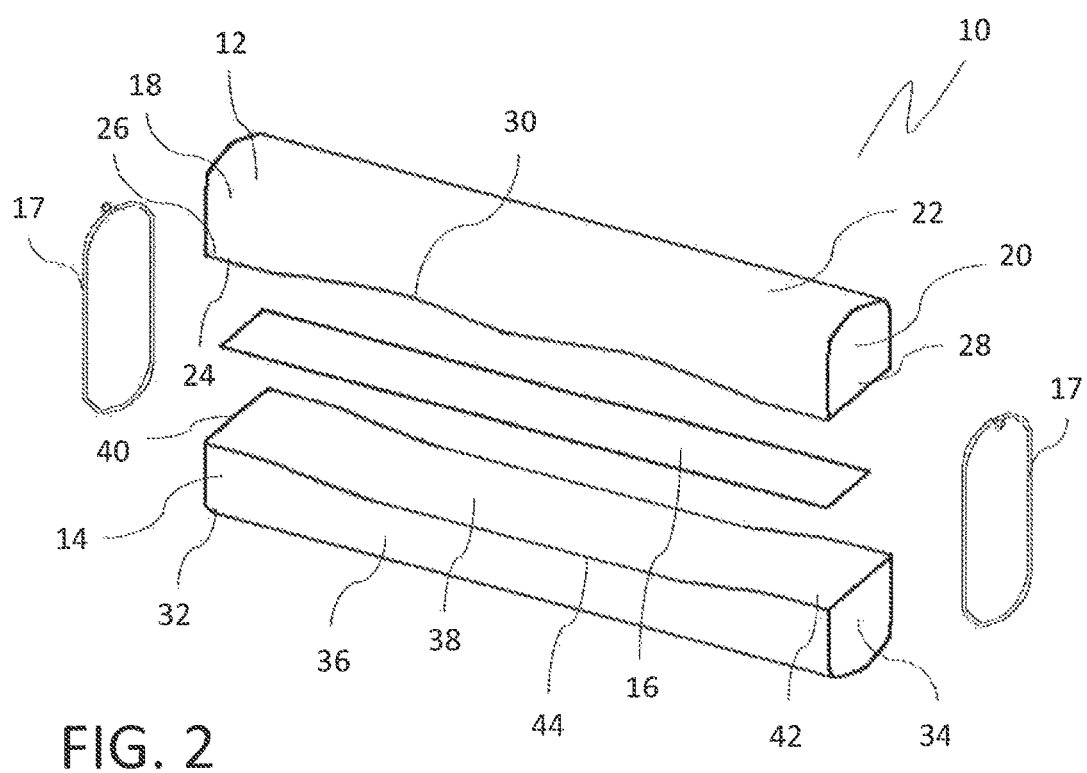
FIG. 2 is an exploded perspective view of the goose call of FIG. 1.

Structure and Relationship of Parts:

Referring to FIG. 2, the main components of goose call 10 are an elongated first housing 12, an elongated second housing 14, a flexible diaphragm 16 and wire binders 17. Referring to FIG. 3, first housing 12 has a first end 18, a second end 20, an exterior surface 22 and an interior surface 24. Interior surface 24 has a first supporting and clamping member 26 at first end 18, a second supporting and clamping member 28 at second end 20, and a first profile of varying depth, generally indicated by reference numeral 30, on that portion of interior surface 24 between first supporting and clamping member 26 and second supporting and clamping member 28. Second housing 14 has a first end 32, a second end 34, an exterior surface 36 and an interior surface 38. Interior surface 38 has a first supporting and clamping member 40 at first end 32, a second supporting and clamping member 42 at second end 34, and a second profile of varying depth, generally indicated by reference numeral 44, on that portion of interior surface 38 between first supporting and clamping member 40 and second supporting and clamping member 42. Wire binders 17 extend around first housing 12 and second housing 14, holding the first end of the first housing 18 to the first end of the second housing 32, ensuring that clamping members 26 and 40 remain clamped together, as well as holding the second end of the first housing 20 to the second end of the second housing 34, ensuring that clamping members 28 and 42 remain clamped together.

Figure 3:
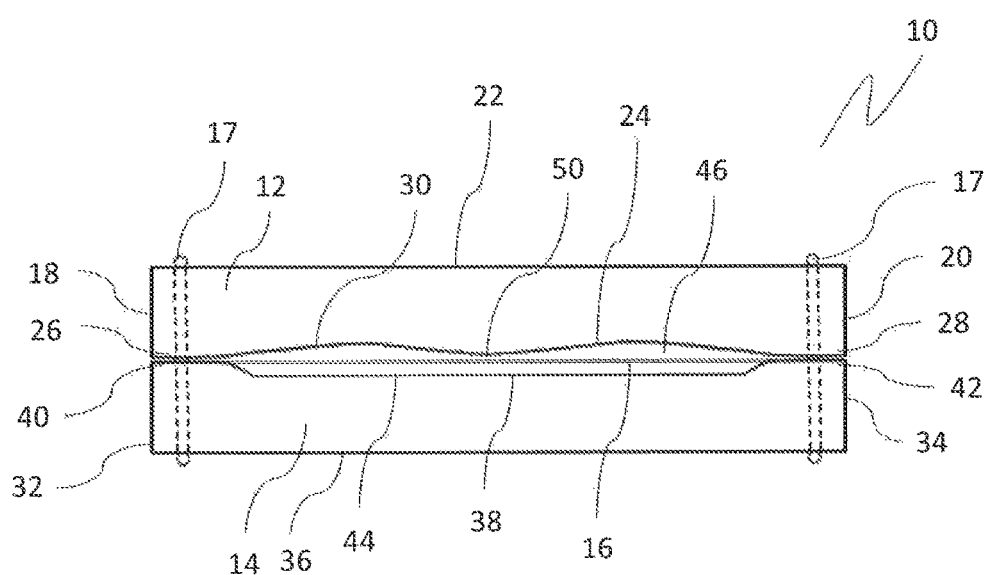
FIG. 3 is a front elevation view, in section, of the goose call of FIG. 1.

Referring to FIG. 1 and FIG. 3, first supporting and clamping member 26 and second supporting and clamping member 28 of first housing 12 engage first supporting and clamping member 40 and second supporting and clamping member 42 of second housing 14 with first profile 30 and second profile 44 collectively forming a blow space, generally indicated by reference numeral 46. A flexible diaphragm 16 is stretched between respective engaged first supporting and clamping members 26 and 40 and respective engaged second supporting and clamping members 28 and 42.

Referring to FIG. 3, first profile 30 and second profile 44 are undulating profiles. In the embodiment illustrated, first profile 30 has a second undulation towards second profile 44 to form a centrally located narrowing 50 in blow space 46.

Operation:

Referring to FIG. 1, with harmonica-style goose call 10, as described above, a user assumes a blow position and by blowing through blow space 46 causes diaphragm 16 to vibrate and emit a tone. Referring to FIGS. 2 and 3, the varying depths of first profile 30 and second profile 44 permit the user to alter the pitch of the emitted tone by selectively altering the blow position. in this way, the user can imitate the sound of a goose by altering the blowing force and the blow position.

Differences with Bays Call:

An examination was conducted of the Bays call to determine other factors that may contribute to a less or greater degree to the strong tonal differences. It is not entirely clear exactly how significant each of these factors may be, but these factors are being disclosed to ensure that successful results are always achieved.

Width dimension—It was noted that goose call 10 is considerably narrower than the Bays call as measured from the blow space positioned at a front of the first housing and the second housing to a back. The Bays call was slightly larger than a standard harmonica. The goose call 10 is smaller than a standard harmonica, with a width dimension of the first housing and the second housing of less than 2 centimetres.

Flexible diaphragm The Bays call and goose call 10 both use an elastic band as a flexible diaphragm. The Bays call has a narrow strip of elastic material that is considerably smaller in width than the width of the housing, covering less than 20%. The flexible diaphragm of goose call 10 is substantially the same width as the housings, covering over 90%.

Embodiments:

In one embodiment, the goose call 10 is primarily constructed from wood. The goose call 10 may also be made from a polymer plastic or other suitable materials. Further, the goose call 10 may vary in overall scale, being larger or smaller to accommodate different users and different goals, in the preferred embodiment, the flexible diaphragm 16 is an elastic band that is substantially the same width as the first housing 12 and the second housing 14. In other embodiments the flexible diaphragm 16 may be narrower and have a smaller width than the first housing 12 and the second housing 14. In the shown embodiment the flexible diaphragm extends the length of the first and second housings 12 and 14. In other embodiments the flexible diaphragm might be shorter than the length of the housings. Slight variations in the shape of the internal profiles 30 and 44, particularly in the steepness of the slopes, may be made to accommodate these different embodiments in order to achieve the goose call sound.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given a broad purposive interpretation consistent with the description as a whole.

What is claimed is:

1. A harmonica-style goose call, comprising:
a body comprising a first housing and a second housing, the body having a first end, a second end, and a length between the first end and the second end, each of the first and second housings having an exterior surface and an interior surface;
a first supporting and clamping member at the first end of the body, and a second supporting and clamping member at the second end of the body;
a profile on a portion of each of the interior surface of the first housing and the interior surface of the second housing between the first supporting and clamping member and the second supporting and clamping member, the body being assembled such that the interior surface of the first housing is adjacent to the interior surface of the second housing,
the profile of the first housing and the profile of the second housing collectively defining a blow space having a first end toward the first end of the body, a second end toward the second end of the body, and a height between the profile of the first housing and the profile of the second housing, wherein at least the profile of the first housing comprises an undulating profile such that the height of the blow space is continuous and variable between the first end and the second end of the blow space and such that the blow space has a centrally located height reduction; and
a flexible diaphragm positioned within the blow space and stretched between the respective first supporting and clamping members and respective second supporting and clamping members,
the undulating profile approaching the flexible diaphragm at the centrally located height reduction of the height of the blow space such that a user, assuming a blow position and blowing through the blow space, causes the diaphragm to vibrate and emit a tone, the varying height of the blow space permitting the user to alter the pitch of the tone by selectively altering the blow position to imitate a goose call.

2. The harmonica-style goose call of claim 1, wherein each of the profile of the first housing and the profile of the second housing are undulating profiles.

3. The harmonica-style goose call of claim 1, wherein a width dimension of the first housing and the second housing is less than 0.7874 inches (2 centimeters).

4. The harmonica-style goose call of claim 1, wherein the flexible diaphragm is an elastic band that is substantially the same width as the first housing and the second housing.

5. The harmonica-style goose call of claim 1, wherein the continuous, variable height blow space is symmetrical about the centrally located height reduction.

6. The harmonica-style goose call of claim 1, wherein the exterior surfaces of the body have a substantially constant height along the length of the body adjacent to the blow space.

* * * * *